US008480296B2

(12) United States Patent
DiPirro et al.

(10) Patent No.: US 8,480,296 B2
(45) Date of Patent: Jul. 9, 2013

(54) LOW TEMPERATURE RADIOMETER

(75) Inventors: Michael DiPirro, Silver Spring, MD (US); Thomas P. Hait, Laurel, MD (US); James G. Tuttle, Columbia, MD (US)

(73) Assignee: United States of America as represented by the Administrator of the National Aeronautics Space Administration, Washington, DC (US)

( * ) Notice: Subject to any disclaimer, the term of this patent is extended or adjusted under 35 U.S.C. 154(b) by 902 days.

(21) Appl. No.: 12/560,535

(22) Filed: Sep. 16, 2009

(65) Prior Publication Data

US 2010/0238970 A1 Sep. 23, 2010

Related U.S. Application Data

(60) Provisional application No. 61/161,579, filed on Mar. 19, 2009.

(51) Int. Cl.
*G01K 7/00* (2006.01)
(52) U.S. Cl.
USPC ............................ 374/130; 374/121; 374/185

(58) Field of Classification Search
USPC ................... 374/120, 132, 133, 130, 126, 131
See application file for complete search history.

(56) References Cited

U.S. PATENT DOCUMENTS

| | | | | |
|---|---|---|---|---|
| 6,183,130 | B1 * | 2/2001 | Adams et al. | 374/131 |
| 6,332,090 | B1 * | 12/2001 | DeFrank et al. | 600/474 |
| 7,048,437 | B2 * | 5/2006 | Bellifernine | 374/121 |
| 2002/0106000 | A1 * | 8/2002 | Morisaki et al. | 374/129 |
| 2008/0291968 | A1 * | 11/2008 | Ernst et al. | 374/131 |
| 2009/0129435 | A1 * | 5/2009 | Lin et al. | 374/121 |

* cited by examiner

*Primary Examiner* — Mirellys Jagan

(57) ABSTRACT

A low temperature radiometer includes a main body, a main cavity, an exit cavity, a suspended thermometer, and an attached thermometer. The main cavity is disposed within the main body and is defined through an off-axis parabolic concentrating cone formed of the inner walls of the main body. The exit cavity is disposed within the main body and is defined through a cylindrical inner surface of the main body. The suspended thermometer is suspended within the exit cavity and is disposed to be in communication with radiation entering the main cavity and being diverted to the exit cavity. The attached thermometer is attached to the outer surface of the main body and is in thermal communication and contact with the main body.

16 Claims, 6 Drawing Sheets

LOW TEMPERATURE RADIOMETER

This application claims priority under 35 U.S.C. §119 to U.S. Provisional Application Ser. No. 61/161,579 entitled "A LOW COST, LOW TEMPERATURE RADIOMETER FOR THERMAL MEASUREMENTS" filed on Mar. 19, 2009, the entire contents of which are hereby incorporated by reference.

This application was made by employees of the United States Government and may be manufactured and used by or for the Government of the United States for government purposes without the payment of royalties thereon or therefor.

BACKGROUND

This application relates generally to the field of radiometers, and specifically to low temperature radiometers of low manufacturing cost.

Space travel may require high-performance, large scale cryogenic systems such as those sunshields and cold instruments of a space telescope. Testing these systems is problematic due to their size and low heat loads allowed. The heat loads may be greatly influenced by non-ideal black-body characteristics of a test chamber, and stray heat from warmer portions of the system and ground support equipment. Accordingly, a low temperature radiometer configured to identify sources of stray heat and further configured to make non-contacting thermal emission measurements is provided herein.

BRIEF SUMMARY

An example embodiment of the present invention includes a low temperature radiometer. The low temperature radiometer may include a main body, a main cavity, an exit cavity, a suspended thermometer, and an attached thermometer. The main cavity is disposed within the main body and is defined through an off-axis parabolic concentrating cone formed of the inner walls of the main body, the cone having an entrance aperture and an exit aperture, the entrance aperture disposed at a first end of the main body, and a longitudinal axis of the main cavity extending from centers of the exit aperture and the entrance aperture. The exit cavity is disposed within the main body and is defined through a cylindrical inner surface of the main body, the cylindrical surface having a longitudinal axis aligned with a longitudinal axis of the main cavity, the cylindrical surface having a first aperture in communication with the exit aperture of the main cavity, and the cylindrical surface having a second aperture disposed at a second end of the main body. The suspended thermometer is suspended within the exit cavity and is disposed to be in communication with radiation entering the main cavity and being diverted to the exit cavity. The attached thermometer is attached to the outer surface of the main body and is in thermal communication and contact with the main body.

An example embodiment of the present invention includes a low-cost method of manufacturing a radiometer. The method includes drilling a main body to define a main cavity and an exit cavity. The main cavity is defined through drilling an off-axis parabolic concentrating cone formed of the inner walls of the main body, the cone having an entrance aperture and an exit aperture, the entrance aperture disposed at a first end of the main body, and a longitudinal axis of the main cavity extending from centers of the exit aperture and the entrance aperture. The exit cavity is defined through drilling a cylindrical inner surface of the main body, the cylindrical surface having a longitudinal axis aligned with a longitudinal axis of the main cavity, the cylindrical surface having a first aperture in communication with the exit aperture of the main cavity, and the cylindrical surface having a second aperture disposed at a second end of the main body. The method further includes plating the inner walls of the main body in a reflective coating and coating the outer surface of the main body with a coating material of high emissivity. The method further includes suspending a suspended thermometer within the exit cavity, the suspended thermometer being arranged to be in communication with radiation entering the main cavity and being diverted to the exit cavity. The method further includes attaching an attached thermometer to the outer surface of the main body, the attached thermometer being in thermal communication and contact with the main body.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
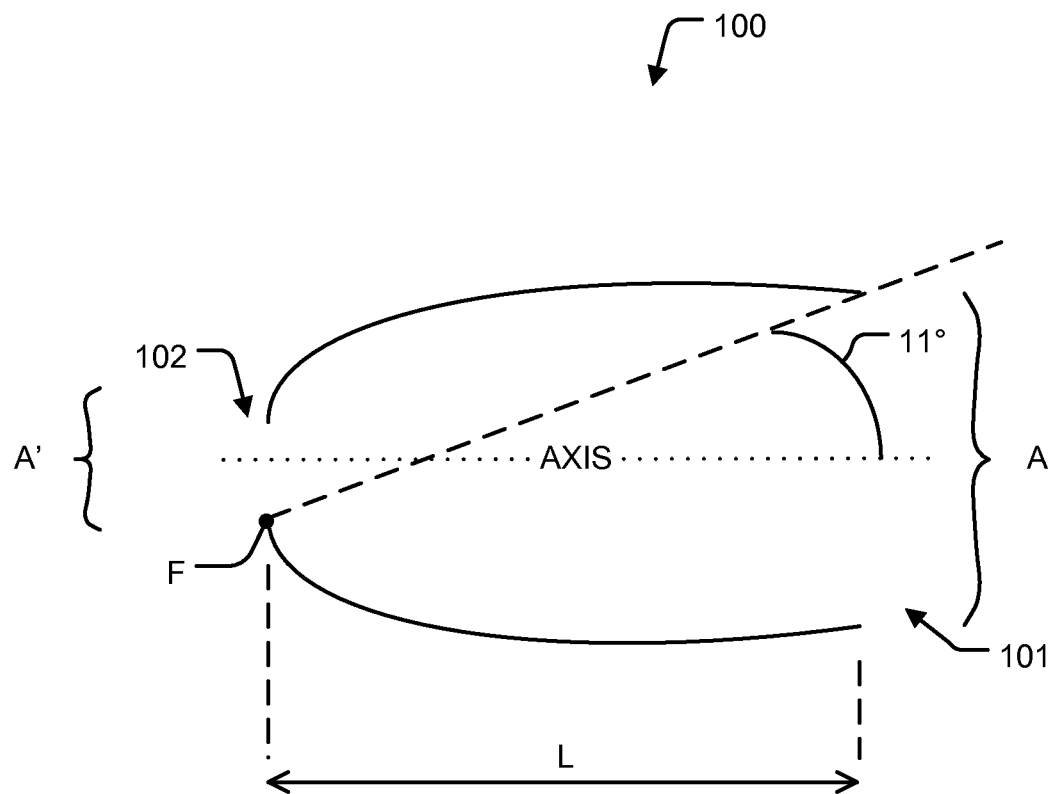
FIG. 1 illustrates a concentrating cone.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. Furthermore, some steps, acts, and/or functions of any methodology may be implemented in alternating order depending upon the function/acts involved.

Hereinafter, example embodiments will be described with reference to the attached drawings. Example embodiments of the present invention may include low temperature radiometers configured to identify sources of stray heat and further configured to make non-contacting thermal emission measurements. The radiometers may be embodied as concentrating cones with thermometers arranged therein and configured to provide the measurements noted above. For example, a Winston cone is an appropriate example of a concentrating cone for the purposes of describing example embodiments. However, it is noted that other slightly modified versions of concentrating cones may be equally applicable, depending upon a particular implementation or desired range of measurement.

As illustrated in FIG. 1, concentrating cone 100 is an off-axis parabola of revolution (i.e., rotated to produce a 3-dimensional surface) configured to increase or maximize collection of incoming rays within a field of view. The concentrating cone 100 may be configured to funnel wavelengths passing through the entrance aperture 101 through to the exit aperture 102. The concentrating cone 100 is shaped to increase or maximize the collection of incoming rays by allowing off-axis rays to make multiple reflections before passing out the exit aperture 102. As illustrated in FIG. 1, entrance aperture 101 includes a diameter of A and exit aperture 102 includes a diameter of A'. As further illustrated, F is the focus of the upper parabola segments, and the length of the concentrating cone is L. It follows that a point similarly in place as F upon the edge of the upper parabola would be the focus of the lower parabola segments. The concentrating cone includes a selectable entrance aperture and a length and exit aperture determined by the acceptance angle desired for incoming radiation (e.g., eleven degrees). Hereinafter, a concentrating cone including an exit cavity is described with reference to FIG. 2.

Figure 2:
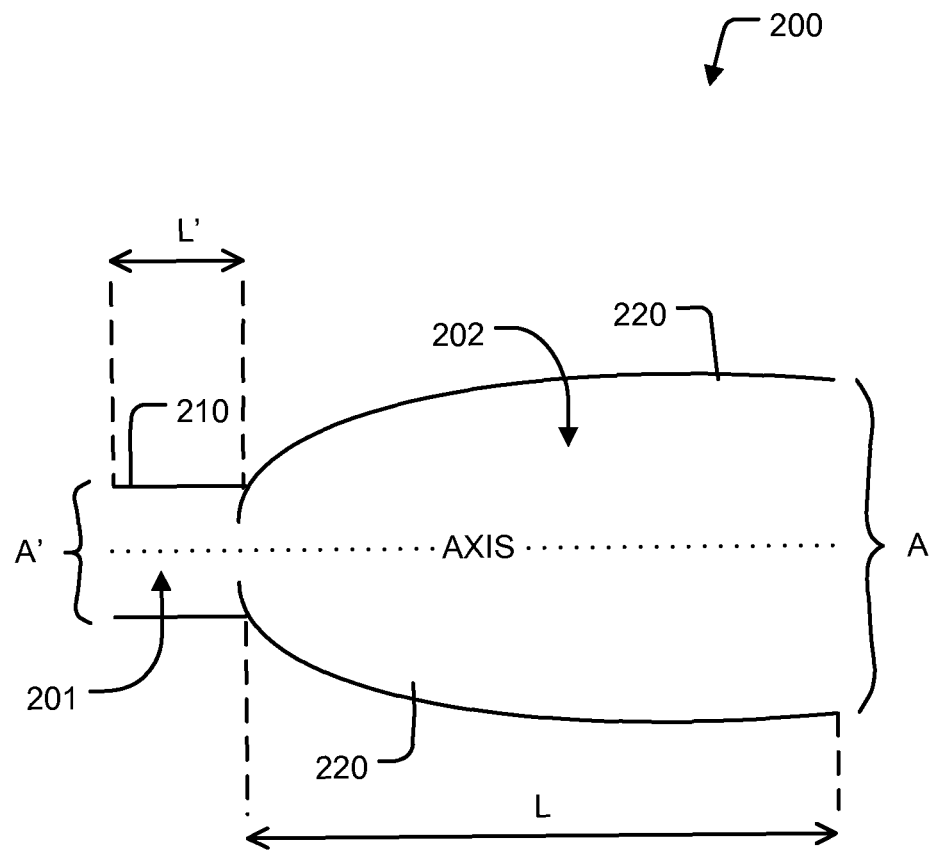
FIG. 2 illustrates a concentrating cone, according to an example embodiment.

FIG. 2 illustrates a concentrating cone 200, according to an example embodiment. The concentrating cone 200 includes an exit cavity 201 and a main cavity 202. The exit cavity 201 is formed of the rear inner walls 210 of the concentrating cone 200. The exit cavity 201 has a diameter A' measured from the inner surface of the rear inner walls 210. The rear inner walls 210 may form a cylindrical shape with relatively constant diameter. The diameter A' may be about 3 mm according to one example embodiment.

The main cavity 202 is formed of the forward inner walls 220 of the concentrating cone 200. The forward inner walls 220 and the rear inner walls 210 are continuous. The main cavity 202 is arranged as a Winston cone with a length L. The main cavity 202 has a diameter A. The diameter A may be about 17 mm according to one example embodiment. Hereinafter, a more detailed illustration of a radiometer is described with reference to FIG. 3.

Figure 3:
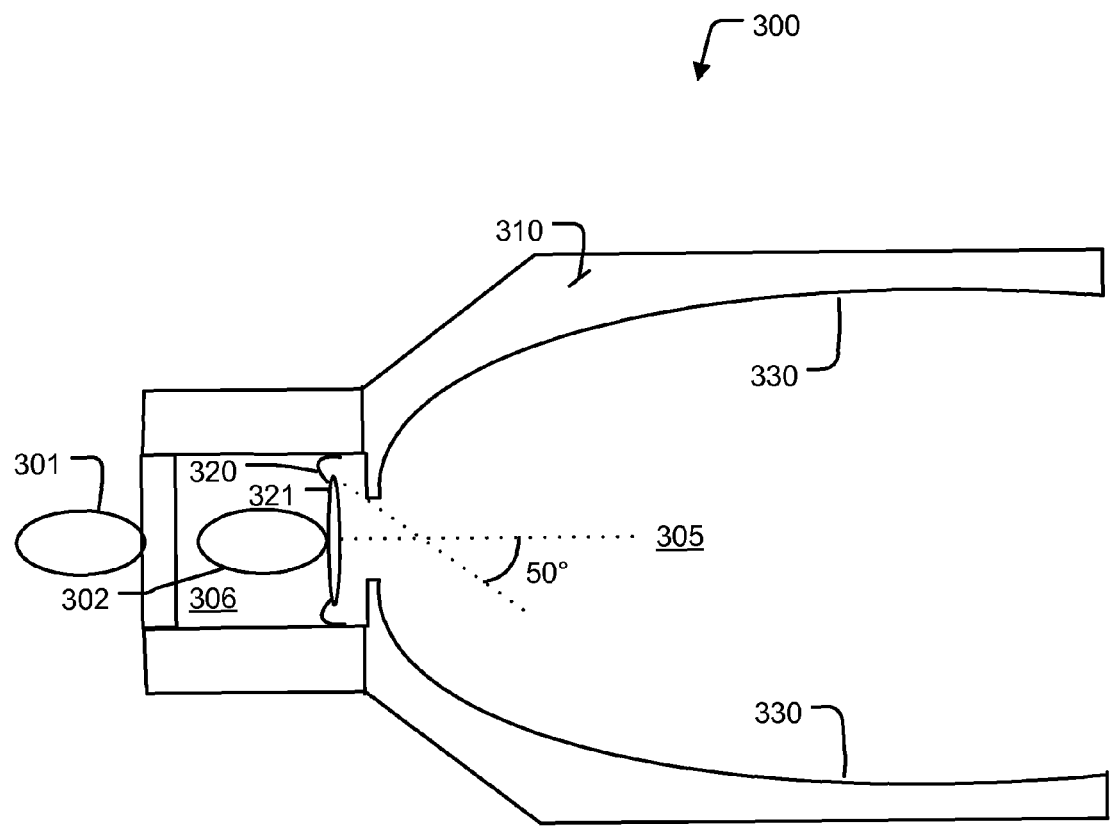
FIG. 3 illustrates a radiometer, according to an example embodiment.

FIG. 3 illustrates a radiometer 300, according to an example embodiment. The radiometer 300 includes a body 310 formed of a sturdy material. For example, a sturdy material may include aluminum, steel, alloys, plastic, or any suitable material. According to at least one example embodiment, the body 310 is formed of an Aluminum alloy, for example, an Al 6061-T6 alloy. The exterior surface of the body may be coated in a coating with relatively high emissivity. For example the coating may be a stainless-steel-powder-loaded epoxy coating. The coating may have the property of nearly wavelength independent absorption over a particular wavelength range. According to at least one example embodiment, the wavelength range is about a micron to about one hundred microns. The body 310 may include a main cavity 330 and an exit cavity 306.

The main cavity 305 may form a concentrating cone, for example a Winston cone. The forward inner walls 330 of the body 310 may form the parabolic surface of the concentrating cone. The exit cavity 306 may be a relatively cylindrical cavity with a relatively constant inner diameter. The exit cavity maybe formed of a separate housing attached to the body 310, or may be formed of the same body 310. The walls of the main cavity 305 and the exit cavity 306 may be coated in a reflective coating, for example, a reflective metallic coating. According to at least one example embodiment, the reflective coating is a Gold coating or Gold plating. It is noted however that the exit cavity may not necessary be coated in reflective coating.

The radiometer 300 may further include a suspended thermometer 302 and absorber or absorbing disk 321. The suspended thermometer 302 may be coated in a coating at least somewhat similar to the coating of the outer surface of the body 310. The absorber 321 may also be coated in a coating at least somewhat similar to the coating of the outer surface of the body 310. The absorber may be a metal or metallic disk. The diameter of the disk 321 should be such that any line within the plane of the longitudinal axis of the concentrating cone, and tangential to both a focal point on the concentrating cone of the main cavity 305 and a point on the circumference of the disk 321, should create an angle of about fifty degrees measured from the longitudinal axis of the concentrating cone. According to at least one example embodiment, the absorber 321 is a 5 mm diameter, 0.12 mm thick disk of copper.

The suspended thermometer 302 may be attached to the absorber 321, which may be suspended by conductive fibers 320, for example, Kevlar fibers, or directly attached to the inner walls of the exit chamber 306. The suspended thermometer may also be suspended by contact leads of the suspended thermometer in addition to, or in combination with, or instead of, conductive fibers 320 and/or attachment to the absorber 321. The conductance of the conductive fibers 320 may be configured to balance sensitivity of the radiometer 300 and dynamic range of the radiometer 300. For example, to configure the radiometer 300 for brighter sources, a more conductive fiber may be used for suspension. Alternatively, to configure the radiometer for weaker sources a less conductive fiber may be used for suspension. The suspended thermometer 302 and absorber 321 are arranged and disposed within the exit cavity 306 such that radiation entering the main cavity 305 is diverted to the absorber 321 and suspended thermometer 302 within the exit cavity 306. For example, the absorber 321 may be positioned behind the exit aperture far enough to reliably not contact the exit, but close enough to absorb most of the energy leaving the exit aperture.

The radiometer 300 may further include an attached thermometer 301 attached to the outer rear surface of the body 310. The attached thermometer 301 may be in thermal communication and contact with the body 310. The attached thermometer 301 may also be coated in a coating at least somewhat similar to the coating of the outer surface of the body 310. The attached thermometer 301 in combination with the suspended thermometer 302 provides a radiometric measuring capability that may be calibrated easily and is relatively insensitive to absolute temperature within the first order.

Both the suspended thermometer 302 and the attached thermometer 301 may be the same type of thermometer. The thermometers 301 and 302 are selected based on the temperature range of desired measurement such that the change in resistance is maximized relative to the total resistance, and the total resistance is kept below 100 kΩ to minimize susceptibility to electromagnetic pick-up. According to example embodiments, the thermometers 301 and 302 may be resistance temperature detecting (RTD) thermometers. According to other example embodiments, the thermometers 301 and 302 may be Silicon Diode thermometers. RTDs may have increased sensitivity at lower temperatures than Silicon Diodes. Further, RTDs may be read out using AC excitation which may reduce or eliminate thermal EMF biases and may be more precise. However, Silicon diode thermometers have relatively uniform characteristics and thus may be used with little or no calibration thereby reducing costs associated with manufacturing radiometer 300. However, it is noted that any suitable thermometer may be used for both thermometers 301 and 302.

Generally, the sensitivity of radiometer 300 depends upon operating temperature, the types of thermometers used for thermometers 301 and 302, and any electronics used in reading out the thermometers 301 and 302. Table 1 below depicts possible sensitivities using RTD thermometers for both thermometers 301 and 302 operated at $T_C$ and a blackbody at $T_H$ are shown in the table below:

TABLE 1

| $T_C$ | $T_H$ | Q (microwatts) | Delta $T_C$ (K) | Sensitivity to +/-$T_H$ (K) | Thermometer Type |
|---|---|---|---|---|---|
| 4.2 | 30 | 0.265 | 0.351 | 0.006 | RTD |
| 20 | 40 | 0.786 | 0.14 | 0.1 | RTD |
| 30 | 50 | 1.782 | 0.203 | 0.11 | RTD |
| 77 | 100 | 21.237 | 1.002 | 0.45 | RTD |

As described above regarding FIG. 1 and FIG. 2, concentrating cones are formed from revolution of of-axis parabolas. Thus, it is readily apparent that radiometer 300 has a circular cross-section. A frontal view of radiometer 300 is provided in FIG. 4.

Figure 4:
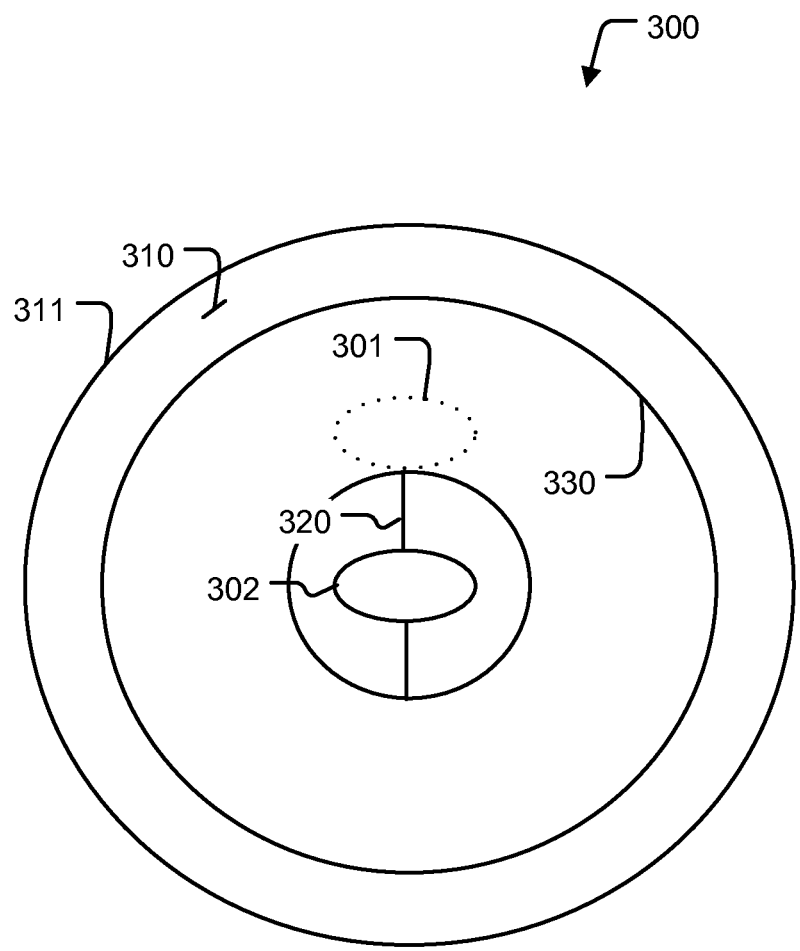
FIG. 4 illustrates a radiometer, according to an example embodiment.

FIG. 4 illustrates a radiometer, according to an example embodiment. As illustrated, the frontal view of radiometer 300 depicts a circular cross-section of the body 310 with an external surface 311. It is noted however, that the entire body 310 need not be circular in cross-section, only the inner surfaces forming main and exit cavities 305 and 306. Thus, a polygonal outer surface of body 310 may be equally suitable. As illustrated, suspended thermometer 302 is arranged within the exit cavity 306, suspended from conductive fibers 320, such that radiation entering the main cavity 306 is directed to the thermometer 302 positioned behind the absorber (not illustrated). As further illustrated, the attached thermometer 301 is attached outside and behind the exit cavity 306 and is in thermal communication and contact with the housing 310.

Figure 5:
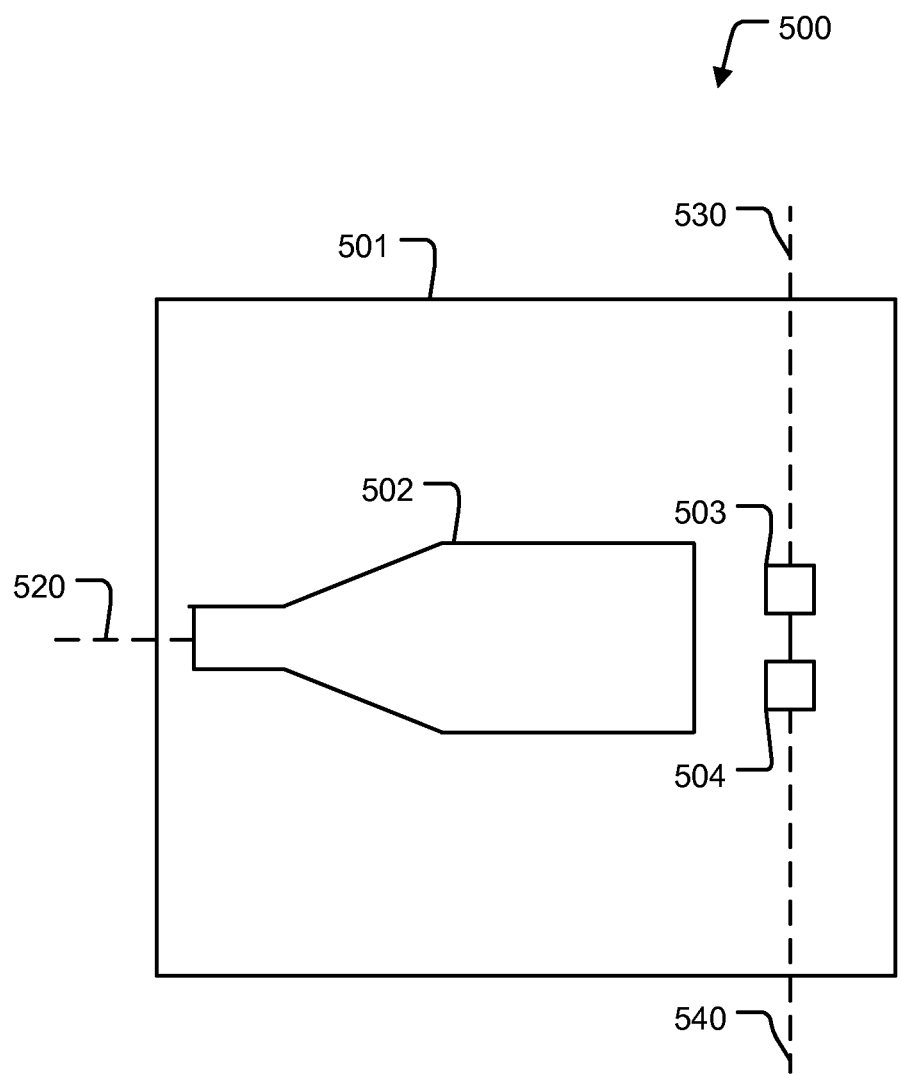
FIG. 5 illustrates a system for calibrating a radiometer, according to an example embodiment.

As briefly described above, different thermometer types may necessitate calibration of a radiometer, according to example embodiments. FIG. 5 illustrates a system 500 for calibrating a radiometer 502, according to an example embodiment. The system 500 may include a black box 501. The black box 501 may be a cubical or nearly cubical box of relatively small dimensions, for example, of about 15 cm inner cavity dimensions, depending upon the final size of radiometer 502. The system 500 may further include the radiometer 502 (e.g., thermometer for calibration) within the black box 501. Radiometer readout leads 520 may exit the black box 501 from any desired side. Due to the relatively small inner dimensions of the black box 501, the temperature of the radiometer 502 may be controlled through desired temperature ranges. For example a desired temperature range may be from about four to 100 Kelvin. Further, the temperature of the black box 501 may be controlled through a similar range.

The system 500 may further include suspended resistors 503 and 504 suspended within the black box 501. The resistors 503 and 504 may be small (e.g., 0.75 mm) cube resistors. The resistors 503 and 504 may be individually heated to differing temperatures through suspension leads 530 and 540. In this manner, the sensitivity of the radiometer 502 may be adequately calibrated through determination of the sensitivity of the radiometer to point sources, and through determination of off-axis radiation rejection (i.e., using two sources of heat). It is noted that radiometers of example embodiments may be calibrated individually if highly sensitive thermometers are used (e.g., RTD thermometers), or a single radiometer may be calibrated with arrangement of thermometers mimicked if more uniform thermometers are used (e.g., Silicon Diode thermometers).

An additional form of calibration may be used. The radiometer may be excited with two different currents or voltages, one which produces little self-heating and one which produces a measurable amount of self-heating. The same joule heat is applied first to the suspended radiometer thermometer and then to the attached thermometer. The difference between the two is the offset in temperature due to the isolation of the conductive fibers. This is a calibration of the conversion of absorbed heat to temperature rise.

Hereinafter, a method of manufacturing/producing radiometers of example embodiments is described with reference to FIG. 6.

Figure 6:
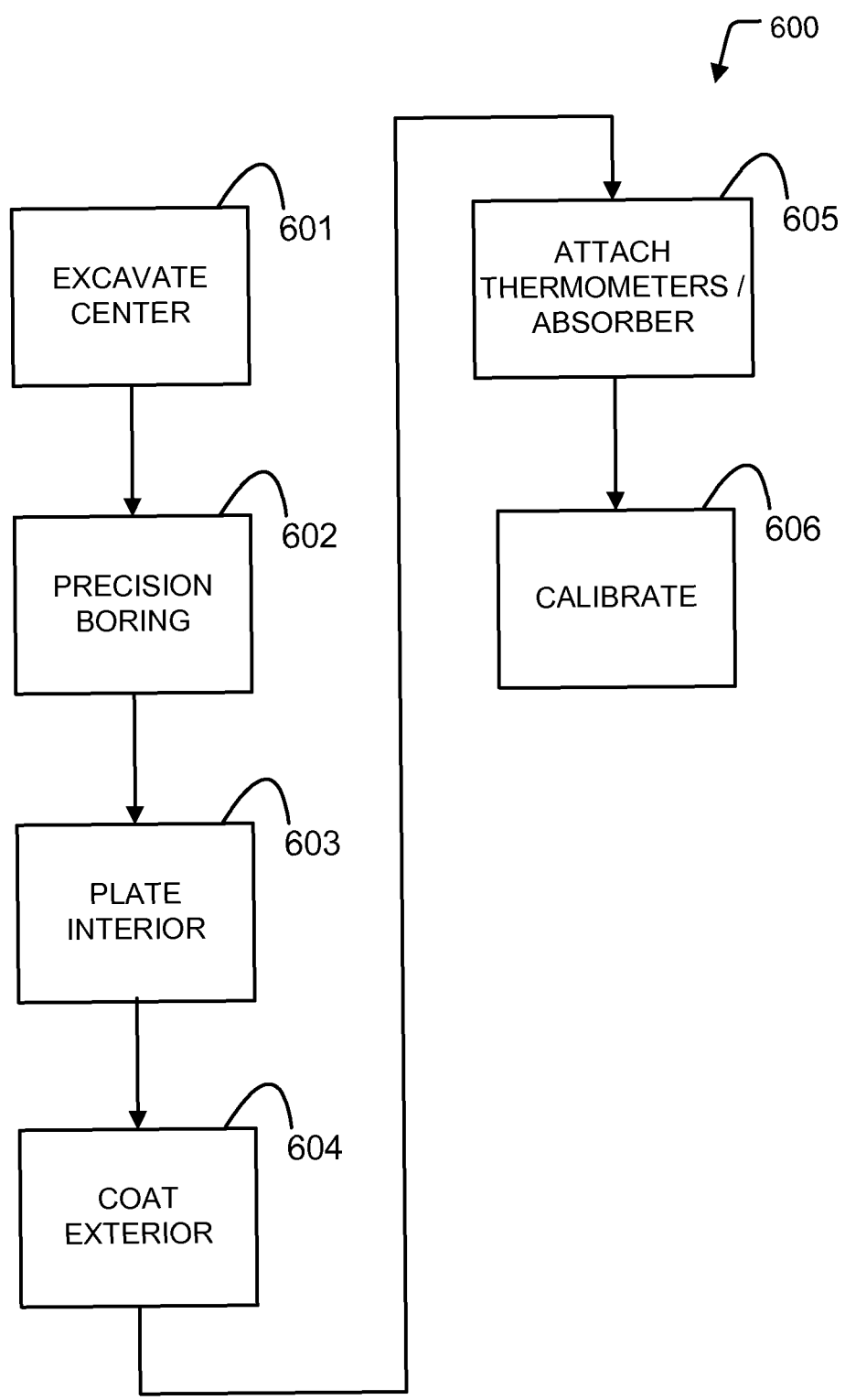
FIG. 6 is a flowchart of a low-cost method of manufacturing a radiometer, according to an example embodiment.

FIG. 6 is a flowchart of a low-cost method 600 of manufacturing a radiometer, according to an example embodiment. The method 600 may include excavating the center of a radiometer body at block 601. The radiometer body may be a sturdy body, for example, aluminum, steel, alloys, plastic, or any suitable material may be used. The center of the body may be excavated to roughly form a main and exit cavity (See FIG. 3-4). The main cavity may be excavated in a generally conical inner shape to roughly form the outline of a concentrating cone, for example, a Winston cone. The exit cavity may be excavated to form a relatively cylindrical cavity. Any suitable mean for excavating may be used. For example, drilling with a lathe may be a suitable means for excavating.

The method 600 may further include precisely boring the main and/or exit cavities of the radiometer body at block 602. Any suitable means for precision boring may be used. For example, precision boring using a fine boring head with a lathe may be a suitable means for precision boring. The radiometer body may be precision bored to define the inner surfaces of the main cavities such that the radiometer's concentrating cone has an acceptance angle of about eleven degrees (see FIG. 1).

The method 600 may further include plating the interior surface of the radiometer body (i.e., main and/or exit cavities) with a reflective plating or coating at block 603. For example reflective metal plating may be used. According to at least one example embodiment, Gold plating may be used.

The method 600 may further include coating the exterior surface of the radiometer body at block 604. The exterior surface of the body may be coated in a coating with relatively high emissivity. For example the coating may be a stainless-steel-powder-loaded epoxy coating. The coating may have the property of nearly wavelength independent absorption over a particular wavelength range. According to at least one example embodiment, the wavelength range is about a micron to about one hundred microns.

The method 600 may further include attaching thermometers to the exterior and interior of the radiometer body at block 605. A suspended thermometer may be suspended from within the interior of the exit cavity on an absorbing disk. The suspended thermometer may be arranged as described above with regards to FIGS. 3-4. Further, an attached thermometer may be attached to the exterior surface of the radiometer body such that it is in thermal contact and communication with the radiometer body. It is noted that the attached thermometer may be attached before coating of the exterior surface of the radiometer body from block 604. In this alternative manner, the attached thermometer may be coated with the exterior surface of the radiometer body simultaneously.

Finally, the method 600 may further include calibrating the manufactured radiometer at block 606. It is noted that this may be omitted for previously calibrated radiometer designs. The calibrating may be performed in a system somewhat similar to the system described above with regards to FIG. 5.

Detailed illustrative embodiments are described above. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A low temperature radiometer, comprising:
a main body;
a main cavity disposed within the main body, the main cavity being defined through an off-axis parabolic concentrating cone formed of the inner walls of the main body, the cone having an entrance aperture and an exit aperture, the entrance aperture disposed at a first end of the main body, and a longitudinal axis of the main cavity extending from centers of the exit aperture and the entrance aperture;
an exit cavity disposed within the main body, the exit cavity being defined through a cylindrical inner surface of the main body, the cylindrical surface having a longitudinal axis aligned with a longitudinal axis of the main cavity, the cylindrical surface having a first aperture in communication with the exit aperture of the main cavity, and the cylindrical surface having a second aperture disposed at a second end of the main body;
a suspended thermometer suspended within the exit cavity, the suspended thermometer disposed to be in communication with radiation entering the main cavity and being diverted to the exit cavity; and
an attached thermometer attached to the outer surface of the main body, the attached thermometer being in thermal communication and contact with the main body; wherein the suspended thermometer is attached to an absorptive disk suspended from conductive fibers attached to the surface of the exit cavity and to the absorptive disk.

2. The radiometer of claim 1, wherein the main cavity has an acceptance angle for incoming radiation of about eleven degrees.

3. The radiometer of claim 1, wherein the conductive fibers are KEVLAR fibers.

4. The radiometer of claim 1, wherein the suspended thermometer is a resistance temperature detecting (RTD) thermometer or a silicon diode.

5. The radiometer of claim 1, wherein the attached thermometer is a resistance temperature detecting (RTD) thermometer or a silicon diode.

6. The radiometer of claim 1, wherein the outer surface of the main body and the attached thermometer are coated in a coating material having wavelength independent absorption over a wavelength range of about one micron to one hundred microns.

7. The radiometer of claim 1, wherein the outer surface of the main body is coated in a coating material of high emissivity.

8. The radiometer of claim 7, wherein the coating material is a stainless-steel-powder-loaded epoxy coating.

9. The radiometer of claim 1, wherein the main cavity is plated in a reflective material.

10. The radiometer of claim 9, wherein the reflective material is Gold plating.

11. The radiometer of claim 1, wherein the exit cavity is plated in a reflective material.

12. The radiometer of claim 11, wherein the reflective material is Gold.

13. The radiometer of claim 1, wherein the attached thermometer is coated in a coating material of high emissivity.

14. The radiometer of claim 13, wherein the coating material is a stainless-steel-powder-loaded epoxy coating.

15. The radiometer of claim 1, wherein the main body is formed of an Aluminum alloy.

16. The radiometer of claim 15, wherein the Aluminum alloy is Al 6061-T6 alloy.

* * * * *